(12) United States Patent
Popp et al.

(10) Patent No.: US 7,724,996 B2
(45) Date of Patent: May 25, 2010

(54) TWO-CHANNEL MULTIMODE ROTARY JOINT

(75) Inventors: Gregor Popp, Munich (DE); Andreas Philipp Seeger, Munich (DE)

(73) Assignee: Schleifring und Apparatebau GmbH, Fuerstenfeldbruck (DE)

( * ) Notice: Subject to any disclaimer, the term of this patent is extended or adjusted under 35 U.S.C. 154(b) by 0 days.

(21) Appl. No.: 12/017,686

(22) Filed: Jan. 22, 2008

(65) Prior Publication Data

US 2008/0175535 A1 Jul. 24, 2008

(30) Foreign Application Priority Data

Jan. 24, 2007 (DE) .................. 10 2007 004 514

(51) Int. Cl.
*G02B 6/00* (2006.01)

(52) U.S. Cl. .......................................... 385/33; 385/26

(58) Field of Classification Search ................ None
See application file for complete search history.

(56) References Cited

U.S. PATENT DOCUMENTS

| | | | | |
|---|---|---|---|---|
| 4,109,998 | A | * | 8/1978 | Iverson .................. 385/26 |
| 4,208,094 | A | * | 6/1980 | Tomlinson et al. ........... 385/18 |
| 4,213,677 | A | * | 7/1980 | Sugimoto et al. ............. 385/34 |
| 4,258,976 | A | * | 3/1981 | Scott et al. ................. 385/26 |
| 4,265,513 | A | * | 5/1981 | Matsushita et al. ........... 385/22 |
| 4,303,300 | A | * | 12/1981 | Pressiat et al. .............. 385/26 |
| 4,303,303 | A | | 12/1981 | Aoyama |
| 4,304,460 | A | * | 12/1981 | Tanaka et al. ............... 385/22 |
| 4,355,864 | A | * | 10/1982 | Soref ...................... 385/18 |
| 4,398,791 | A | * | 8/1983 | Dorsey .................... 385/26 |
| 4,401,365 | A | * | 8/1983 | Mizokawa et al. ............ 385/20 |
| 4,477,190 | A | * | 10/1984 | Liston et al. ............... 356/418 |
| 4,484,793 | A | | 11/1984 | Laude |
| 4,550,975 | A | * | 11/1985 | Levinson et al. ............. 385/34 |
| 4,636,030 | A | | 1/1987 | Carter et al. |
| 4,641,915 | A | * | 2/1987 | Asakawa et al. ............. 385/26 |
| 4,725,116 | A | * | 2/1988 | Spencer et al. .............. 385/26 |

(Continued)

FOREIGN PATENT DOCUMENTS

DE   20018842   1/2001

(Continued)

OTHER PUBLICATIONS

Office Action mailed Jul. 9, 2008 for U.S. Appl. No. 12/017,739.

(Continued)

*Primary Examiner*—Frank G Font
*Assistant Examiner*—Peter Radkowski
(74) *Attorney, Agent, or Firm*—Kevin L. Daffer; Daffer McDaniel, LLP

(57) ABSTRACT

An optical two-channel rotary joint that is also suitable for coupling of single-mode fibers comprises two housing parts that are rotatable relative to each other. Each of these housing parts accommodates a light-waveguide for supplying light and a light-waveguide for withdrawing light. The arrangement has two optical paths adapted to operate in opposite directions, with each light-waveguide for supplying light being coupled with a light-waveguide for withdrawing light. Furthermore, one focuser is disposed on each of the light-waveguides for supplying light, which focuses the light of the light-waveguide for supplying light onto the corresponding light-waveguide for withdrawing light.

20 Claims, 1 Drawing Sheet

U.S. PATENT DOCUMENTS

| | | | |
|---|---|---|---|
| 4,753,506 A * | 6/1988 | Einhorn et al. | 385/26 |
| 4,789,215 A | 12/1988 | Anderson et al. | |
| 4,815,812 A * | 3/1989 | Miller | 385/61 |
| 4,820,045 A * | 4/1989 | Boisde et al. | 356/319 |
| 4,842,355 A * | 6/1989 | Gold et al. | 385/26 |
| 4,848,867 A * | 7/1989 | Kajioka et al. | 385/25 |
| 4,872,737 A * | 10/1989 | Fukahori et al. | 385/25 |
| 4,900,117 A * | 2/1990 | Chen | 385/26 |
| 4,911,520 A * | 3/1990 | Lee | 385/16 |
| 4,943,137 A * | 7/1990 | Speer | 385/26 |
| 4,989,946 A | 2/1991 | Williams et al. | |
| 5,033,813 A * | 7/1991 | Westfall | 385/16 |
| 5,039,193 A * | 8/1991 | Snow et al. | 385/25 |
| 5,115,481 A | 5/1992 | Buhrer | |
| 5,137,351 A * | 8/1992 | So | 356/73.1 |
| 5,140,289 A * | 8/1992 | Andrieu et al. | 333/256 |
| 5,157,745 A * | 10/1992 | Ames | 385/26 |
| 5,271,076 A * | 12/1993 | Ames | 385/26 |
| 5,371,814 A * | 12/1994 | Ames et al. | 385/25 |
| 5,392,370 A | 2/1995 | Gryk | |
| 5,402,509 A * | 3/1995 | Fukushima | 385/33 |
| 5,404,414 A * | 4/1995 | Avelange et al. | 385/34 |
| 5,422,969 A * | 6/1995 | Eno | 385/54 |
| 5,442,721 A * | 8/1995 | Ames | 385/26 |
| 5,450,194 A * | 9/1995 | Dureault et al. | 356/319 |
| 5,469,277 A | 11/1995 | Kavehrad et al. | |
| 5,481,631 A | 1/1996 | Cahill et al. | |
| 5,539,577 A * | 7/1996 | Si et al. | 359/629 |
| 5,542,012 A * | 7/1996 | Fernandes et al. | 385/25 |
| 5,566,260 A | 10/1996 | Laughlin | |
| 5,568,578 A * | 10/1996 | Ames | 385/34 |
| 5,588,077 A * | 12/1996 | Woodside | 385/26 |
| 5,588,078 A * | 12/1996 | Cheng et al. | 385/33 |
| 5,612,824 A * | 3/1997 | Si et al. | 359/652 |
| 5,621,573 A * | 4/1997 | Lewis et al. | 359/634 |
| 5,621,830 A * | 4/1997 | Lucey et al. | 385/25 |
| 5,633,963 A * | 5/1997 | Rickenbach et al. | 385/25 |
| 5,682,449 A * | 10/1997 | Taira-Griffin | 385/47 |
| 5,748,811 A | 5/1998 | Amersfoort et al. | |
| 5,799,121 A * | 8/1998 | Duck et al. | 385/47 |
| 5,828,146 A * | 10/1998 | Lorenz et al. | 310/68 D |
| 5,845,023 A * | 12/1998 | Lee | 385/33 |
| 5,912,775 A * | 6/1999 | Glockler | 359/831 |
| 5,917,625 A | 6/1999 | Ogusu et al. | |
| 5,917,626 A * | 6/1999 | Lee | 398/88 |
| 5,926,593 A * | 7/1999 | Asami et al. | 385/34 |
| 5,946,431 A * | 8/1999 | Fernandes | 385/25 |
| 5,960,133 A | 9/1999 | Tomlinson | |
| 6,014,484 A * | 1/2000 | Duck et al. | 385/34 |
| 6,084,994 A * | 7/2000 | Li et al. | 385/31 |
| 6,108,471 A | 8/2000 | Zhang et al. | |
| 6,215,924 B1 * | 4/2001 | Hulse et al. | 385/34 |
| 6,335,993 B1 * | 1/2002 | Takahashi | 385/25 |
| 6,355,993 B1 * | 3/2002 | Takahashi | 385/25 |
| 6,422,761 B1 * | 7/2002 | Naghski et al. | 385/73 |
| 6,501,877 B1 | 12/2002 | Weverka et al. | |
| 6,519,392 B2 * | 2/2003 | Im et al. | 385/48 |
| 6,522,800 B2 * | 2/2003 | Lucero | 385/16 |
| 6,525,876 B1 * | 2/2003 | Gilbert et al. | 359/391 |
| 6,546,162 B1 * | 4/2003 | Copner et al. | 385/16 |
| 6,625,346 B2 | 9/2003 | Wilde | |
| 6,636,664 B2 | 10/2003 | Snyder et al. | |
| 6,687,010 B1 * | 2/2004 | Horii et al. | 356/479 |
| 6,704,477 B2 | 3/2004 | Zhou | |
| 6,749,344 B2 * | 6/2004 | Hamm et al. | 385/72 |
| 6,760,506 B2 * | 7/2004 | Laor | 385/18 |
| 6,782,160 B2 * | 8/2004 | Townsend et al. | 385/25 |
| 6,804,435 B2 * | 10/2004 | Robilliard et al. | 385/33 |
| 6,823,097 B2 | 11/2004 | Glebov et al. | |
| 6,859,581 B1 * | 2/2005 | Smith et al. | 385/26 |
| 6,860,644 B2 * | 3/2005 | Gage et al. | 385/74 |
| 6,868,205 B2 | 3/2005 | Weverka et al. | |
| 6,898,346 B2 * | 5/2005 | Mercey et al. | 385/26 |
| 6,999,663 B2 * | 2/2006 | Gage et al. | 385/48 |
| 7,010,191 B2 * | 3/2006 | Poisel et al. | 385/25 |
| 7,079,723 B2 | 7/2006 | Bortolini et al. | |
| 7,142,747 B2 * | 11/2006 | Oosterhuis et al. | 385/26 |
| 7,148,773 B2 * | 12/2006 | Lohr | 333/257 |
| 7,239,776 B2 * | 7/2007 | Oosterhuis et al. | 385/25 |
| 7,248,761 B2 * | 7/2007 | Schilling et al. | 385/25 |
| 7,298,538 B2 * | 11/2007 | Guynn et al. | 359/212 |
| 7,301,629 B2 * | 11/2007 | Bambot et al. | 356/337 |
| 7,302,133 B2 | 11/2007 | Akashi | |
| 7,317,850 B2 | 1/2008 | Nakano et al. | |
| 7,372,230 B2 * | 5/2008 | McKay | 318/568.2 |
| 7,373,041 B2 * | 5/2008 | Popp | 385/26 |
| 7,433,556 B1 * | 10/2008 | Popp | 385/26 |
| 2001/0046345 A1 | 11/2001 | Snyder et al. | |
| 2002/0060862 A1 * | 5/2002 | Liu et al. | 359/811 |
| 2003/0004412 A1 * | 1/2003 | Izatt et al. | 600/425 |
| 2003/0053749 A1 | 3/2003 | Weverka et al. | |
| 2003/0081901 A1 * | 5/2003 | Gage et al. | 385/48 |
| 2003/0095742 A1 | 5/2003 | Zhou | |
| 2003/0179993 A1 | 9/2003 | Shigenaga et al. | |
| 2003/0202737 A1 | 10/2003 | Zhou | |
| 2003/0210859 A1 * | 11/2003 | Mercey et al. | 385/26 |
| 2004/0076357 A1 | 4/2004 | Maki et al. | |
| 2004/0076369 A1 | 4/2004 | Tai | |
| 2005/0036735 A1 * | 2/2005 | Oosterhuis et al. | 385/26 |
| 2006/0239608 A1 | 10/2006 | Akashi | |
| 2006/0257077 A1 * | 11/2006 | Oosterhuis et al. | 385/74 |
| 2006/0260832 A1 * | 11/2006 | McKay | 174/1 |
| 2007/0003187 A1 | 1/2007 | Nakano et al. | |
| 2007/0019908 A1 * | 1/2007 | O'Brien et al. | 385/36 |
| 2007/0053632 A1 | 3/2007 | Popp | |
| 2007/0184934 A1 * | 8/2007 | Zhang et al. | 475/347 |
| 2007/0217736 A1 * | 9/2007 | Zhang et al. | 385/26 |
| 2007/0268805 A1 * | 11/2007 | Popp et al. | 369/110.04 |
| 2008/0175536 A1 | 7/2008 | Krumme | |

FOREIGN PATENT DOCUMENTS

| | | |
|---|---|---|
| EP | 111390 A2 * | 6/1984 |
| EP | 0293568 | 12/1988 |
| EP | 1143274 A2 * | 10/2001 |
| JP | 57100407 A * | 6/1982 |
| JP | 57100408 A * | 6/1982 |
| JP | 58007115 A * | 1/1983 |
| JP | 58215540 A * | 12/1983 |
| JP | 60007415 A * | 1/1985 |
| JP | 01032225 A * | 2/1989 |
| JP | 01204006 A * | 8/1989 |
| JP | 02141708 A * | 5/1990 |
| JP | 02173519 A * | 7/1990 |
| JP | 03031807 A * | 2/1991 |
| JP | 03163503 A * | 7/1991 |
| JP | 03231208 A * | 10/1991 |
| JP | 04204809 A * | 7/1992 |
| JP | 05134140 A * | 5/1993 |
| JP | 2002311351 A * | 10/2002 |

OTHER PUBLICATIONS

Office Action mailed Jan. 8, 2009 for U.S. Appl. No. 12/017,739.

* cited by examiner

TWO-CHANNEL MULTIMODE ROTARY JOINT

PRIORITY CLAIM

The present application claims priority to pending German Application No. 102007004514.1 filed on Jan. 24, 2007.

BACKGROUND OF THE INVENTION

1. Field of the Invention

The invention relates to a single-mode rotary joint for optical signals, having two channels, with which the signals can be simultaneously transmitted in opposite directions.

2. Description of the Prior Art

Because of their greater flexibility and robustness, optical bus systems are frequently used instead of cable-bound bus systems. With bus systems of this kind, signals or information are regularly transmitted in two opposite directions of the bus system, in order to make possible a bidirectional communication between different subscribers.

Optical rotary joints are known for transmission of optical signals between units that are rotatable relative to each other.

An optical rotary joint for a plurality of channels, having a Dove prism, is disclosed in U.S. Pat. No. 5,568,578. With a rotary joint of this kind, substantially more than two channels may be transmitted. It thus offers an excellent flexibility. However, the high costs of the elaborate mechanical arrangement render an optical joint of this kind of no interest for many applications.

A rotary joint having two channels is disclosed in U.S. Pat. No. 5,588,077. In all embodiments, one beam path (channel B) is widened by a pair of lenses, and then again narrowed, the optical elements of the other beam path (channel A) being disposed therein. Complex lens systems are needed with this device in which, in particular, a widening of the channel B must be effected to the extent that the optical elements of the channel A have an only insignificant effect. Furthermore, this device cannot be constructed to have rotational symmetry, because at least two light guides must be inserted into the beam path radially from the outside. This non-symmetry leads to an attenuation that is dependent upon an angle of rotation.

Another two-channel rotary joint is disclosed in DE 20018842. With this, light is coupled from a light-guiding fiber disposed to be inclined to the axis of rotation into another light-guiding fiber which is rotatable relative thereto and disposed on the rotation axis. Another corresponding coupling means is provided for the opposite beam path. A disadvantage of this arrangement is that the attenuation is very large with single-mode fibers.

BRIEF SUMMARY OF THE INVENTION

The invention is based on the object of redesigning a rotary joint for bidirectional transmission of optical signals so that it will have a relatively low transmission loss which is substantially not dependent upon a rotation angle.

In accordance with the invention, the above object is achieved with an optical rotary joint comprising: a first housing part and a second housing part connected to each other by means of a bearing unit to be rotatable about a rotation axis; a first optical path comprising a first light-waveguide on the first housing part for supplying light, and a second light-waveguide on the second housing part for withdrawing light; a second optical path extending in an opposite direction and comprising a third light-waveguide on the second housing part for supplying light, and a fourth light-waveguide on the first housing part for withdrawing light; in which the second and fourth light-waveguides are disposed along the rotation axis, and the first and third light-waveguides are disposed laterally of the rotation axis at an angle to the rotation axis so that light beams supplied from end faces of the first and third light-waveguides are incident on end faces of the second and fourth light-waveguides, respectively; wherein a first focuser for focusing a light beam emitted by the first light-waveguide onto the end face of the second light-waveguide is provided at the end face of the first light-waveguide; and wherein a second focuser for focusing a light beam emitted by the third light-waveguide onto the end face of the fourth light-waveguide is provided at the end face of the third light-waveguide.

BRIEF DESCRIPTION OF THE DRAWING

In the following the invention will be described by way of example without limitation of the general inventive concept on an example of embodiment and with reference to the drawing.

DETAILED DESCRIPTION OF PREFERRED EMBODIMENTS

Figure 1:
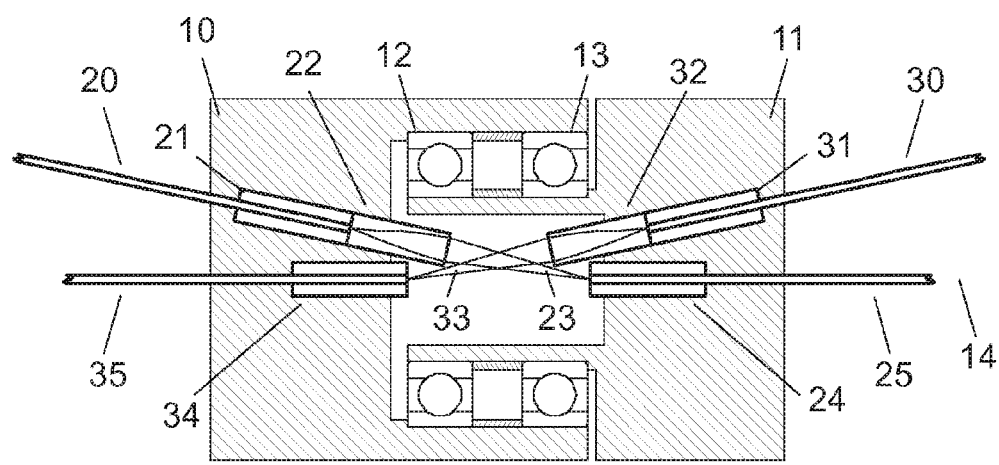
FIG. 1 schematically shows in a general form a rotary joint in accordance with the invention.

The device according to the invention comprises a first housing part 10 and also a second housing part 11 which are connected together to be rotatable about the rotation axis 14 by means of a bearing unit 12, 13. The first optical path comprises a first light-waveguide 20 on the first housing part 10 for supplying light, which is accommodated in the first ferrule 21. At the end of the light-waveguide there is provided a first focuser 22 for focusing the light 23 emitted by the light-waveguide onto the second light-waveguide 25. The light-waveguide 25 on the second housing part 11 is itself accommodated in a ferrule 24. The second light path extending in the opposite direction comprises a third light-waveguide 30 on the second housing part 11 for supplying light, the third light-waveguide being accommodated in the ferrule 31. At the end of the third light-waveguide there is provided a second focuser 32 for focusing the light 33 emitted by the light-waveguide onto the fourth light-waveguide 35. The light-waveguide 35 on the first housing part 10 is accommodated in the second ferrule 34.

In accordance with the invention, the light-waveguides 25, 35 for withdrawing light are aligned along the rotation axis 14. The light-waveguides 20, 30 for supplying light are disposed at an angle oblique to the rotation axis 14, and also to be lateral of the rotation axis 14, so that the light beam is incident at the middle of the light-waveguides 25, 35 for withdrawing light.

With its basic principle, a rotary joint in accordance with the invention, having two channels, is suitable exclusively for signal transmission in one given direction. Thus, the first light path leads from the first light-waveguide 20 to the second light-waveguide 25. The second light path extends in the opposite direction from the third light-waveguide 30 to the fourth light-waveguide 35. With this, a transmission in two opposite directions is possible. This permits, exactly as with bus systems, communication needed in two directions, and also imposes no restriction on most of the conventional bus systems, because these use an own light-waveguide for each direction.

The term light-waveguides is used here in a general form. Preferably glass fibers, and most preferably single-mode fibers are used as light-waveguides. Alternatively, synthetic resin fibers can also be used as light-waveguides.

The term ferrules 21, 24, 31 and 34 is used here in a general sense for elements for supporting or guiding the light-waveguides. Alternatively, any desired elements having similar functions may be used. Alternatively, the light-waveguides could be also directly joined to the first housing part 10 or the second housing part 11.

The term focuser refers to any desired beam guiding and/or beam shaping element that is capable of imaging the light emitted by the first light-waveguide 20 or the third light-waveguide 30 onto the end face of the second light-waveguide 25 or the fourth light-waveguide 35, respectively. A focuser may be also a collimator. A particular advantage of the invention resides in only one single focuser being needed per channel, as distinct from prior art as known for example from U.S. Pat. No. 5,568,578. As these component parts are usually expensive and involve laborious adjustment, a substantial reduction of costs can be achieved with an embodiment such as that according to the invention.

A correct design of the focusers has a substantial effect on the coupling attenuation of the rotary joint. In the following, reference is made to the magnification factor of a focuser. This is defined here as the ratio of the beam diameter on the receiving side (e.g. end of the light-waveguide 20, or end of the light-waveguide 30) to the beam diameter on the entry side (e.g. end of the light-waveguide 25, or end of the light-waveguide 35). In an ideal case, a magnification factor of 1 would offer a minimum of transmission loss, if the area of a light-waveguide on the entry side were to be identically imaged upon the area of a light-waveguide on the exit side. In fact, however, the mechanical tolerances of the entire arrangement must also be taken into account.

In an advantageous manner the magnification factor of a focuser according to the invention is dimensioned so that it is less than 1, and thus all the light on the transmitting side is coupled-in on the receiving side.

With particularly advantageous dimensioning, the magnification factor of a focuser according to the invention is chosen so that the light spot diameter on the receiving side is smaller or equal to the diameter of the receiving light-waveguide minus the sum of all concentricity and eccentricity tolerances of the device.

An advantageous further development of the invention resides in an element for increasing the coupling efficiency being mounted in at least one light path directly in front of the end of a light-waveguide 25, 35 of the receiving side. An element of this kind for increasing the coupling efficiency can be, for example, a fiber taper, a prism, or a ground fiber end, in particular also a ground end of a light-waveguide on the receiving side.

In another advantageous embodiment of the invention, the optical components of the two optical paths are displaced relative to each other. For this it is of importance that at least one light-waveguide for supplying light 20, 30, together with its assigned focuser 22, 32, be displaced relative to the light-waveguide for withdrawing light 35, 25, disposed on the same housing part 10, 11, along the direction of the corresponding light-waveguide for withdrawing light 25, 35. Thus, the end of at least one light-waveguide for supplying light and the end of the light-waveguide for withdrawing light, disposed on the same housing part, are not flush with each other. Thereby, in particular, the lengths of the optical paths can be reduced. Thus, the front edge of at least one focuser can be brought closer to the rotation axis of the rotary joint. With a flush arrangement, the front edge of at least one focuser would be spaced from the rotation axis by at least the radius of a ferrule of a light-waveguide for withdrawing light. Inside the rotary joint, only the region for the beam path need be kept unobstructed by other components. Therefore the front edge can now be brought as close to the rotation axis as a light beam diameter. As a result, not only the optical path, but also the constructional size of the entire arrangement can be shortened.

As shown in FIG. 1, a rotary joint in accordance with the invention comprises a first housing part 10 and also a second housing part 11 that are connected to each other by means of a bearing unit 12, 13 to be rotatable about the rotation axis 14. The bearing unit is here embodied using two ball bearings 12, 13, for example. Of course, in accordance with the inventive concept any other suitable bearing design would be possible. The first optical path comprises a first light-waveguide 20 on the first housing part 10 for supplying light, which is accommodated in the first ferrule 21. At the end of the light-waveguide there is provided a first focuser 22 for focusing the light 23 emitted by the light-waveguide onto the second light-waveguide 25. The light-waveguide 25 on the second housing part 11 is itself accommodated in a ferrule 24. The second light path extending in the opposite direction comprises a third light-waveguide 30 on the second housing part 11 for supplying light, the third light-waveguide being accommodated in the ferrule 31. At the end of the third light-waveguide there is provided a second focuser 32 for focusing the light 33 emitted by the light-waveguide onto the fourth light-waveguide 35. The light-waveguide 35 on the first housing part 10 is accommodated in the second ferrule 34. In this embodiment, the components of the first and second optical paths are displaced relative to each other in order to reduce the optical path length and the entire constructional size of the arrangement.

In another advantageous development of the invention, the optical components of both optical paths are displaced relative to each other along the direction of the optical path and parallel to the rotation axis. Hereby, in particular, the length of the optical paths can be reduced. Furthermore, the constructional space of the entire arrangement can be shortened.

The invention claimed is:

1. An optical rotary joint, comprising:
   a first housing part and a second housing part connected to each other by means of a bearing unit to be rotatable about a rotation axis;
   a first optical path comprising a first light-waveguide on the first housing part for supplying light, and a second light-waveguide on the second housing part for withdrawing light;
   a second optical path extending in an opposite direction and comprising a third light-waveguide on the second housing part for supplying light, and a fourth light-waveguide on the first housing part for withdrawing light;
   in which the second and fourth light-waveguides are disposed along the rotation axis;
   wherein a first focuser for focusing a light beam emitted by the first light-waveguide onto the end face of the second light-waveguide is provided at the end face of the first light-waveguide;
   wherein a second focuser for focusing a light beam emitted by the third light-waveguide onto the end face of the fourth light-waveguide is provided at the end face of the third light-waveguide; and
   wherein the first and second focusers are disposed laterally from the rotation axis at an oblique angle to the rotation axis so that light beams supplied from end faces of the first and third light-waveguides are incident on end faces of the second and fourth light-waveguides, respectively.

2. The optical rotary joint of claim 1, wherein at least one of the light-waveguides is fixed in a ferrule.

3. The optical rotary joint of claim 1, wherein a magnification of at least one focuser is less than 1.

4. The optical rotary joint of claim 1, wherein a magnification of at least one focuser is such that it forms on the end face of a light-waveguide for withdrawing light a light spot having a diameter that is less than or equal to a diameter of the end face of the light-waveguide for withdrawing light, minus a sum of all concentricity and eccentricity tolerances of the rotary joint.

5. The optical rotary joint of claim 1, wherein an element for increasing coupling efficiency is disposed in the light path in front of at least one of the second and fourth light-waveguides.

6. The optical rotary joint of claim 5, wherein the element for increasing coupling efficiency is one of a fiber taper and a prism.

7. The optical rotary joint of claim 1, wherein an end of at least one of the second and fourth light-waveguides is ground.

8. The optical rotary joint of claim 1, wherein at least one of the light-waveguides for supplying light, together with an assigned focuser, is displaced relative to a light-waveguide for withdrawing light disposed on a same housing part, along a direction of the light-waveguide for withdrawing light disposed on the same housing part.

9. An optical rotary joint, comprising:
a first housing part and a second housing part connected to each other by means of a bearing unit to be rotatable about a rotation axis;
a first light-waveguide and a fourth light-waveguide disposed on the first housing part;
a second light-waveguide and a third light-waveguide disposed on the second housing part, wherein the second and fourth light-waveguides are disposed along the rotation axis;
a first beam guiding element disposed at an end face of the first light-waveguide for directing a light beam emitted by the first light-waveguide toward an end face of the second light-waveguide;
a second beam guiding element disposed at an end face of the third light-waveguide for directing a light beam emitted by the third light-waveguide toward an end face of the fourth light-waveguide; and
the first and second beam guiding elements are disposed laterally from the rotation axis at an oblique angle to the rotation axis.

10. The optical rotary joint of claim 9, wherein the first light waveguide and the first beam guiding element are disposed such that a light beam emitted by the first light-waveguide is directly incident to the end face of the second light-waveguide.

11. The optical rotary joint of claim 9, wherein the third light waveguide and the second beam guiding element are disposed such that a light beam emitted by the third light-waveguide is directly incident to the end face of the fourth light-waveguide.

12. The optical rotary joint of claim 9, wherein the first beam guiding element is the only beam guiding element distinct from the first and second light-waveguides disposed along an optical channel comprising the first and second light-waveguides.

13. The optical rotary joint of claim 9, wherein the second beam guiding element is the only beam guiding element distinct from the third and fourth light-waveguides disposed along an optical channel comprising the third and fourth light-waveguides.

14. The optical rotary joint of claim 9, wherein a magnification of at least one of the first and second beam guiding elements is less than 1.

15. An optical rotary joint, comprising:
a first housing part and a second housing part connected to each other by means of a bearing unit to be rotatable about a rotation axis;
a first optical path comprising:
a first light-waveguide on the first housing part for supplying light;
a second light-waveguide on the second housing part for withdrawing light; and
a single first beam guiding element distinct from the first and second light-waveguides disposed at an end face of the first light-waveguide for directing a light beam emitted by the first light-waveguide directly onto an end face of the second light-waveguide;
a second optical path comprising:
a third light-waveguide on the second housing part for supplying light;
a fourth light-waveguide on the first housing part for withdrawing light; and
a single second beam guiding element distinct from the third and fourth light-waveguides disposed at an end face of the third light-waveguide for directing a light beam emitted by the third light-waveguide directly onto an end face of the fourth light-waveguide;
wherein second and fourth light-waveguides are disposed along the rotation axis; and
wherein the first and second beam guiding elements are disposed laterally from the rotation axis at an oblique angle to the rotation axis.

16. The optical rotary joint of claim 15, wherein at least one of the first and second beam guiding elements is a focusing lens.

17. The optical rotary joint of claim 15, wherein at least one of the first and second beam guiding elements is a collimator.

18. The optical rotary joint of claim 15, wherein at least one of the first and second optical paths is unidirectional.

19. The optical rotary joint of claim 15, wherein a magnification of at least one the first and second beam guiding elements is less than 1.

20. The optical rotary joint of claim 15, further comprising an element for increasing coupling efficiency which is disposed in front of at least one of the second and fourth light-waveguides.

* * * * *